(12) United States Patent
Browen

(10) Patent No.: US 6,633,832 B1
(45) Date of Patent: Oct. 14, 2003

(54) PCI-X BUS SYSTEM TESTING AND VERIFICATION APPARATUS AND METHOD

(75) Inventor: Adam Browen, Colo. Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 322 days.

(21) Appl. No.: 09/795,770

(22) Filed: Feb. 28, 2001

Related U.S. Application Data

(63) Continuation-in-part of application No. 09/546,786, filed on Apr. 11, 2000.

(51) Int. Cl.⁷ .............................................. G06F 11/30
(52) U.S. Cl. .................... 702/186; 702/117; 702/80; 702/57; 710/313; 710/315; 711/101; 711/103; 714/715; 714/30
(58) Field of Search ............... 702/117–119, 57–59, 702/121–124, 127, 176, 182, 183, 185, 186, 188, 189, 191, 193, FOR 103, 104, 134, 171; 714/25–30, 39, 43, 45, 47, 48, 56, 718, 719, 734, 742; 711/101–106; 710/300–305, 313–315; 324/601–604

(56) References Cited

U.S. PATENT DOCUMENTS 5,903,577 A  *  5/1999  Tenne ....................... 371/22.1
6,202,103 B1 *  3/2001  Vobank et al. ............. 710/129
6,449,677 B1 *  9/2002  Olarig et al. ............... 710/305
2002/0016942 A1 *  2/2002  McLaren et al. ........... 714/718

OTHER PUBLICATIONS

Cases et al., Design, Modeling and Simulation Methodology for PCI–X Subsystems, Jan. 2000, IEEE, vol. 7803–6450, pp. 33–36.*

* cited by examiner

Primary Examiner—Marc S. Hoff
Assistant Examiner—Elias Desta
(74) Attorney, Agent, or Firm—Suiter West PC LLO

(57) ABSTRACT

An improved PCI-X verification method and apparatus provides iterative testing of all desired conditions or protocol combinations in a PCI-X system. One or more commands may be tested in combination with one or more functional behavior parameters throughout a desired range of variable parameter values. In one aspect, an apparatus and method for testing a PCI-X device for compliance under the PCI-X Addendum to the PCI Local Bus Specification in completer operation are provided. In another aspect, an apparatus and method for testing a PCI-X-device for compliance under the PCI-X addendum to the PCI Local Bus Specification in requester operation are provided.

36 Claims, 6 Drawing Sheets

KEY TO

PCI-X BUS SYSTEM TESTING AND VERIFICATION APPARATUS AND METHOD

CROSS-REFERENCES

The present application is a continuation-in-part of U.S. patent application Ser. No. 09/546,786, filed Apr. 11, 2000. Said U.S. patent application Ser. No. 09/546,786 is herein incorporated by reference in its entirety.

FIELD OF THE INVENTION

The present invention relates generally to information handling systems including computer systems and related devices and, more particularly, to a method and apparatus for identifying functional problems in a PCI-X design via iterative testing of PCI-X protocol.

BACKGROUND OF THE INVENTION

Once a component of an information handling system has been designed, system designers may need to verify its operation to ensure that it operates as designed and that it interfaces properly with each of the other elements of the system.

In order to verify that each element of a newly designed system functions properly, system verification engineers may create a computer model of the system or components to be tested. Although simulation and design verification software reveal many problems, many designs must undergo lengthy and expensive debug phases before yielding fully operational, full specification parts.

A prior art method of system verification involves the use of exercisers/analyzers. Typically, an exerciser randomly selects operations to be performed or applied to the device under test. The advantage of using exercisers/analyzers is that they tend to provide more complete tests in a shorter time frame. The use of exercisers, however, is not without drawbacks. One problem associated with using random exercisers in a PCI-X environment is that it is typically a fully automated process with a high level of randomness and thus does not guarantee that a given condition or PCI-X protocol combination has been tested or that a system has been fully tested. It would, therefore, be desirable to provide an improved PCI-X verification method and apparatus that can be automated to provide iterative testing of all desired conditions or protocol combinations in a PCI-X system.

SUMMARY OF THE INVENTION

Accordingly, the present invention is directed to an improved PCI-X verification method and apparatus that can be automated to provide iterative testing of desired conditions or protocol combinations in a PCI-X system.

In one aspect, the present invention provides a method for the automatic testing of a PCI-X bus system in an information handling system, such as a computer system, comprising the steps of selecting a PCI-X command to be tested; programming a PCI-X requester to exhibit predetermined functional behavior during a PCI-X transaction; asserting the PCI-X command to initiate a PCI-X transaction, the transaction comprising transfer of data over the PCI-X bus; transferring at least a portion of the data; monitoring and recording the behavior of the PCI-X bus system; determining whether a PCI-X protocol error has occurred; if an error has occurred, logging the error and halting execution; repeating the process until it is determined that an error has occurred or until the PCI-X transaction is complete; and, if the PCI-X transaction is completed, writing data from a first memory location to a second memory location, reading data from the second memory location, and comparing data from the first memory location to data from the second memory location. In a further aspect, one or more commands may be tested in combination with one or more functional behavior parameters throughout a desired range of variable parameter values.

In another aspect, the present invention provides a method for the automatic testing of a PCI-X bus system in an information handling system comprising the steps of initializing a PCI or PCI-X completer device, which is programmable to exhibit predetermined functional behavior during a PCI-X transaction; programming the PCI or PCI-X completer device to exhibit the predetermined functional behavior during the PCI-X transaction; providing a PCI-X requester device, the PCI-X requester device comprising configuration address space, the configuration address space programmable to configure the PCI-X requester device; programming the configuration address space to provide a first set of PCI-X bus utilization properties for the PCI-X requester device; after the PCI-X completer device is programmed to exhibit the predetermined functional behavior, initiating the PCI-X transaction, the transaction comprising transfer of data over the PCI-X bus; transferring at least a portion of the data; monitoring and recording the behavior of the PCI-X bus system; determining whether a PCI-X protocol error has occurred; if an error has occurred, logging the error and halting execution; repeating the process until it is determined that an error has occurred or until the PCI-X transaction is complete; and, if the PCI-X transaction is complete, writing data from a first memory location to a second memory location, reading data from the second memory location, and comparing data from the first memory location to data from the second memory location. In a further aspect, one or more commands may be tested in combination with one or more functional behavior parameters throughout a desired range of variable parameter values.

It is to be understood that both the foregoing general description and the following detailed description are exemplary and explanatory only and are not restrictive of the invention as claimed. The accompanying drawings, which are incorporated in and constitute a part of the specification, illustrate presently preferred embodiments of the invention, and together with the general description given above and the detailed description of the preferred embodiments given below, serve to explain the principles of the invention.

BRIEF DESCRIPTION OF THE DRAWINGS

The detailed description of the invention may be best understood when read in reference to the accompanying drawings wherein.

DETAILED DESCRIPTION OF THE INVENTION

Figure 1:
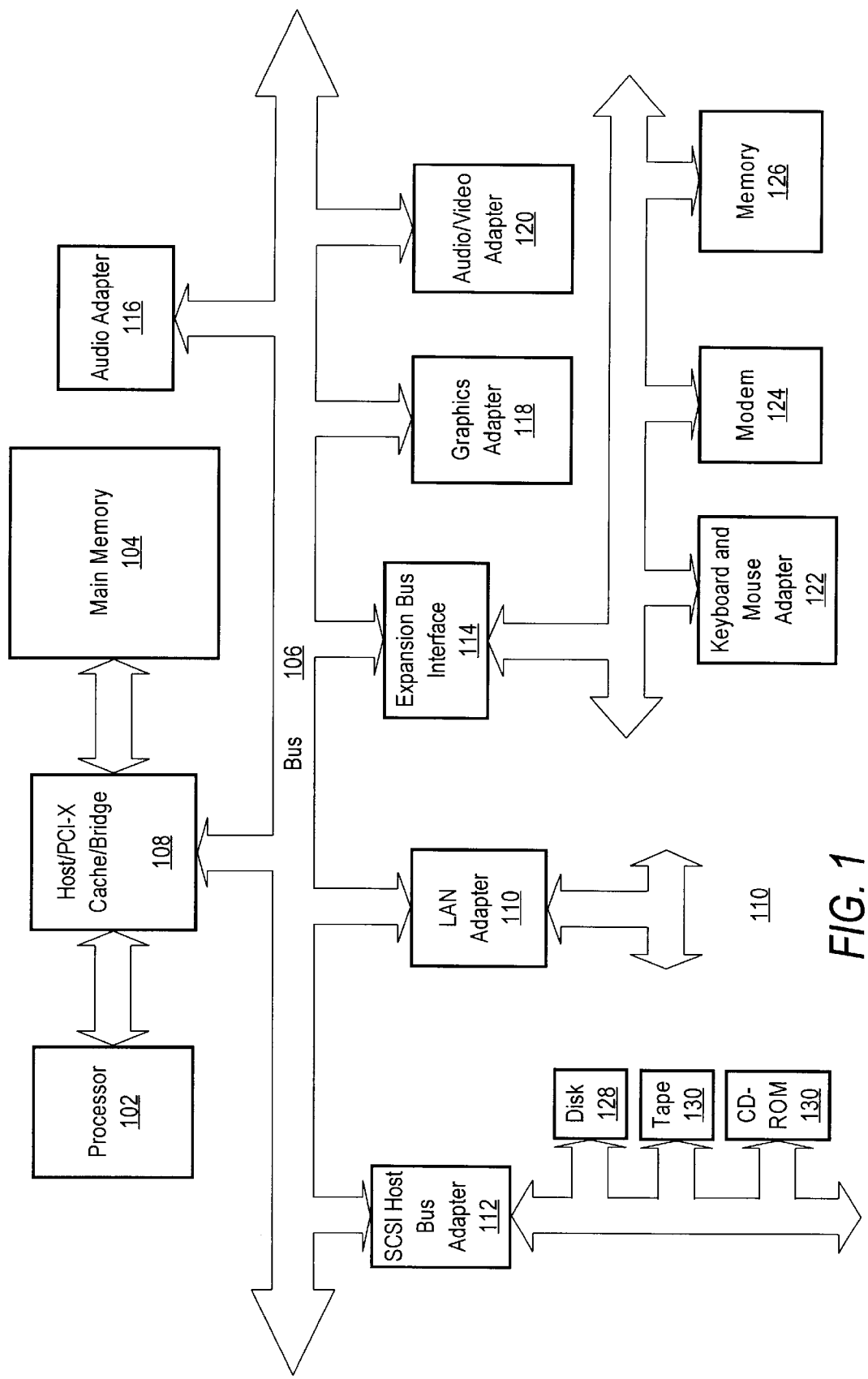
FIG. 1 is a block diagram illustrating a hardware system in accordance with the present invention.

With reference now to the figures, and in particular with reference to FIG. 1, a block diagram of a data processing system 100 in which the present invention may be implemented is illustrated. Data processing system 100 employs a peripheral component interconnect (PCI-X) local bus architecture. Although the depicted example employs a PCI-X bus, other bus architectures such as Micro Channel and ISA may also be used. Processor 102 and main memory 104 are connected to PCI-X local bus 106 through host/PCI-X bridge 108. Bridge 108 also may include an integrated memory controller and cache memory for processor 102. Additional connections to PCI-X local bus 106 may be made through direct component interconnection or through add-in boards. In the depicted example, local area network (LAN) adapter 110, SCSI host bus adapter 112, and expansion bus interface 114 are connected to PCI-X local bus 106 by direct component connection. In contrast, audio adapter 116, graphics adapter 118, and audio/video (A/V) adapter 120 are connected to PCI-X local bus 106 by add-in boards inserted into expansion slots. In the depicted example, audio/visual adapter 120 is a multifunction device containing two agents. Those of ordinary skill in the art will realize that other devices, such as, for example, a dual channel SCSI adapter or a SCSI/Ethernet adapter also may be attached to data processing system 100. Additionally, other numbers of agents other than two may be included in a multifunction device in accordance with a preferred embodiment of the present invention in the depicted example, the arbitration processes are implemented within the multifunction device.

PCI-X is an extension of the PCI architecture that provides greater I/O bandwidth by increasing the maximum bus frequency of PCI from 66 to 133 MHz and by increasing the efficiency of bus traffic. In embodiments of the invention, PCI-X bus 106 can run at 33 to 133 MHz. The PCI-X bus 106 runs at the speed of the slowest device connected to the bus. Further, PCI-X local bus 106 is preferably backwards compatible with PCI devices. Thus, the PCI-X local bus may be capable of running at lower speeds to work with PCI devices. PCI-X local bus 106 may utilize either a 32-bit-wide or 64-bit-wide data path.

Expansion bus interface 114 provides a connection for a keyboard and mouse adapter 122, modem 124, and additional memory 126. SCSI host bus adapter 112 provides a connection for hard disk drive 128, tape drive 130, and CD-ROM 132 in the depicted example. Typical PCI-X local bus implementations will support a single PCI-X expansion slot or ad-in connector at 133 MHz, two PCI-X expansion slots or ad-in connectors at 100 MHz, or four or more PCI-X expansion slots or add-in connectors at 66 MHz. The depicted example includes four loads on the motherboard and three expansion slots. Those of ordinary skill in the art will appreciate that the hardware in FIG. 1 may vary. For example, other peripheral devices, such as optical disk drives and the like may be used in addition to or in place of the hardware depicted in FIG. 1. The depicted example is not meant to imply architectural limitations with respect to the present invention.

Figure 2:
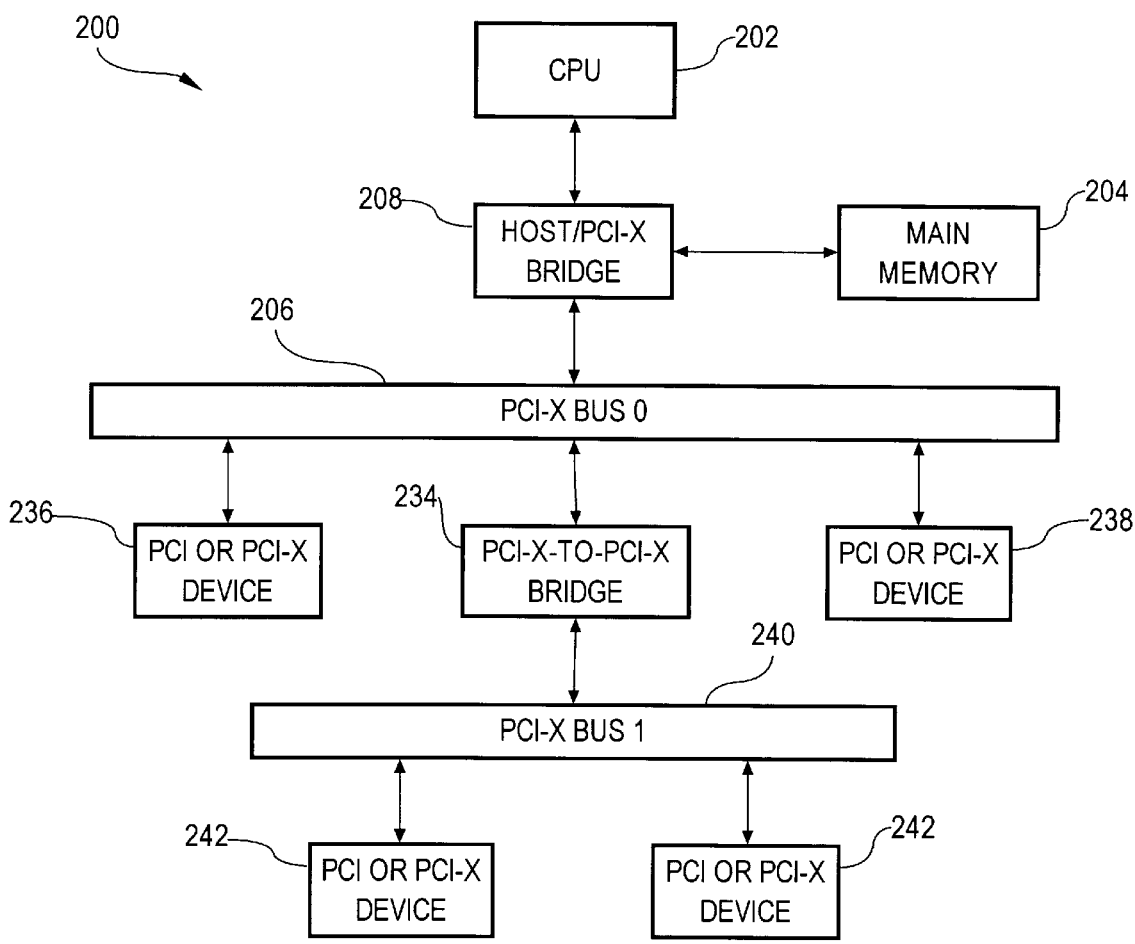
FIG. 2 is a block diagram illustrating an exemplary PCI-X system operable to embody the present invention.

Referring now to FIG. 2, there is shown a block diagram of a typical PCI-X system 200. Primary or root PCI-X bus 206 is connected to host processor 202 by processor-to-PCI-X bridge or "north bridge" 208, which is incorporated into the system controller. Primary PCI-X bus 206 may have one or more PCI-X-to-PCI-X bridges 234 thereon. Secondary PCI-X bus 240 is controlled by PCI-X-to PCI-X bridge 234. The PCI-X bus may be populated with devices 236, 238, 242 and 244 requiring accesses to each other and/or main memory 204. The method in accordance with this teaching may be implemented in software using one or more PCI-X bus exercisers/analyzers which are controlled via PCI-X. Examples of such exercisers/analyzers are the E2920 series PCI and PCI-X exerciser/analyzer cards, and particularly an E2929A PCI-X exerciser/analyzer card, available from Agilent Technologies.

Figure 3:
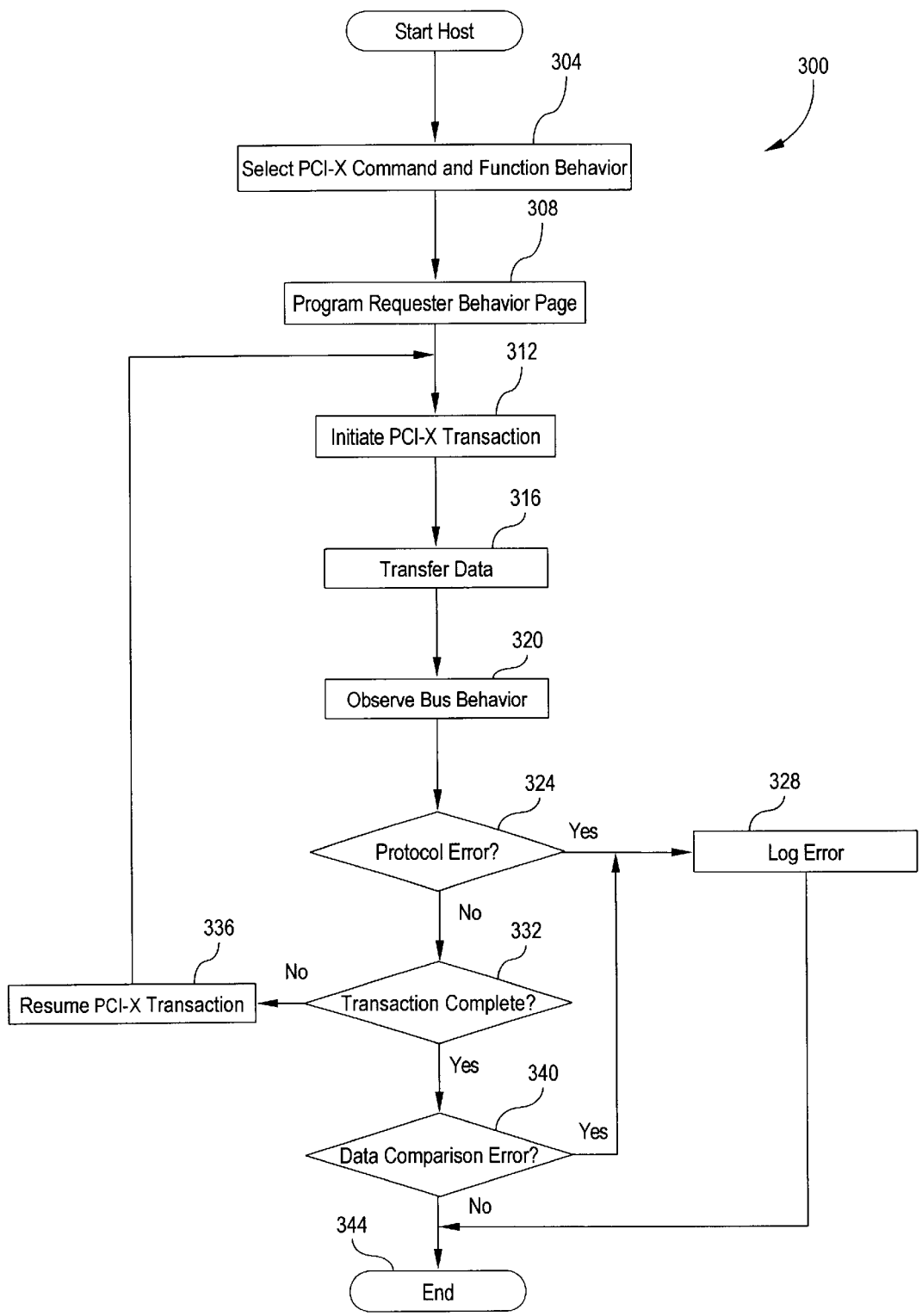
FIG. 3 is a flow diagram illustrating a PCI or PCI-X completer verification method according to the present invention.

Referring now to FIG. 3, there is shown a flow chart outlining a method 300 according to a first embodiment of the present invention wherein a PCI or PCI-X device is fully tested for PCI-X compliance under the PCI-X addendum to the PCI Local Bus Specification in completer operation. Briefly, a PCI-X requester-initiator is programmed to act or behave in a specific way during a PCI-X transaction, and the completer response is observed. The programmed behavior of the requester-initiator may be correct or incorrect behavior under the PCI-X protocol. The PCI or PCI-X completer device under test is monitored to determine whether the completer device correctly abides by the PCI-X protocol during the transaction.

In step 304, a PCI-X command and requester functional behavior is selected. This includes selecting a PCI-X command to be executed (e.g., memory read block/memory write block, I/O read/write, and so forth) and selecting a functional behavior set. The requester functional behavior is determined by selecting the desired requester behavior page properties and setting the appropriate PCI-X configuration space bits (e.g., max. memory read byte count, max. outstanding split transactions, latency timer, and so forth) for the transaction.

In step 308, the requester behavior page is programmed with information selected in step 304. This includes the overall size of the transfer and the specific burst length to be used, what byte lanes should be enabled/disabled at the beginning and at the end of a transaction, 32-bit or 64-bit operation, bus command type, PCI-X disconnect at a specified allowable disconnect boundary (ADB) or boundaries, and various other behavioral characteristics specific to a PCI-X requester-initiator. Also, the desired source/destination address alignment for the transaction is set. This allows for full testing on various memory address alignments and cache boundaries. The requester behavior page properties are divided into two main sections, address/attribute phase behaviors and data phase behaviors. The requester behavior is then controlled by how these various phase properties are programmed. Possible address/attribute phase behaviors include delaying the REQ/assertion if a transaction is ready to be generated, FRAME/assertion control from the time GNT/is asserted, 32-bit or 64-bit request, byte count control, bus command control, and varied address alignments. Possible data phase behaviors include masking byte enables at the beginning and end of a sequence and disconnecting at a specified ADB in the transaction.

In step 312 a PCI-X transaction is initiated, starting with the programmed source/destination address alignment as well as the selected PCI-X command and any relevant behavior properties specific to the Address/Command phase (i.e., 32-bit or 64-bit operation).

In step 316 data is transferred, and behavior page properties specific to the data phase (i.e., disconnecting at specified ADB) are applied during the data transfer. In step 320, the bus is monitored to assure that no PCI-X protocol specifications (i.e., according to promulgated standards) are violated for the currently executing transfer. In one embodiment, the bus is monitored for PCI-X protocol violations in accordance with the PCI-X Addendum 1.0 to the PCI Local Bus Specification, Revision 2.2, published by PCI Special Interest Group. The aforementioned PCI Local Bus Specification, Revision 2.2 and the PCI-X Addendum 1.0 to the PCI Local Bus Specification, Revision 2.2 are incorporated herein by reference in their entireties. Bus observation may be accomplished by snooper logic that monitors output and that preferably records the output in some storage medium. The output may include internal signal levels, values of internal queues of the device or devices under test, conventional output values (e.g., at the I/O pin of the device or devices under test) and so forth. If protocol violations are observed in step 324, then the error is signaled and logged in step 328, and the transaction ends (344). If no protocol violations occur in step 324, the process continues to step 332.

In step 332, it is determined if the transaction under test is complete. If the transaction is not complete, it is resumed in step 336. Since requester behavior is ultimately controlled by the behavior page (programmed in step 308), in the case where the transaction is resumed (336), the process returns to step 312 and initiates the programmed sequence, this time starting at a different line in the behavior page.

After the transfer is complete in step 332, a data comparison error check is executed in step 340. For each test, with each varied parameter, there is executed some type of a write followed by a read command (whether the command combination under test is memory write and memory read block or whatever command combination is being used) and a data comparison is performed. Data corruption is checked in step 340 rather than step 320 for a number of reasons. First, at step 320 it is not yet known whether or not the transaction is complete. Additionally, data corruption can occur at times without violating PCI-X protocol. If no data comparison error is detected in step 340, the process ends (344). If a data miscompare is detected in step 340, the error is logged in step 328 and the process ends at step 344. If desired, the process 300 can be repeated for any additional PCI-X commands and/or requester functional behaviors to be tested. In one embodiment, one or more commands are tested in combination with one or more functional behavior parameters throughout a desired range of variable functional behavior parameter values. In this manner, one or more variable requester functional behavior parameters may be incremented throughout a predetermined range of values to provide complete iterative testing of all desired commands and completer functional behavior parameter combinations.

Figure 4A:
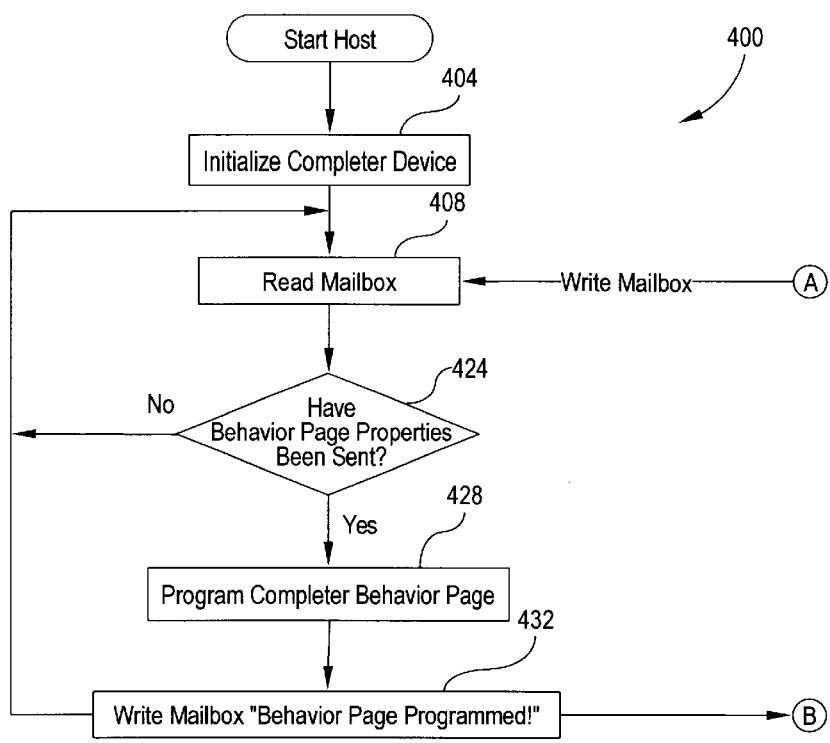
FIG. 4 is a flow diagram illustrating a PCI-X requester verification method according to the present invention.
Figure 4:
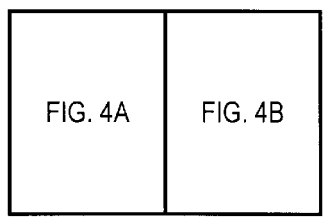

Referring now to FIG. 4, there is shown a flowchart outlining a method for testing a PCI-X requester for compliance under the PCI-X Addendum to the PCI Local Bus Specification in accordance with the present invention. Briefly, method 400 can be used to test a PCI-X device in requester operation. Through software, the completer can be programmed to act or behave a specific way during a PCI-X transaction, wherein the programmed completer behavior may be correct or incorrect behavior in accordance with the PCI-X Addendum to the PCI Local Bus Specification. The PCI-X requester is then observed in response to the completer's programmed behavior to determine if the requester device correctly abides by the PCI-X protocol in response to the completer's behavior.

Figure 5:
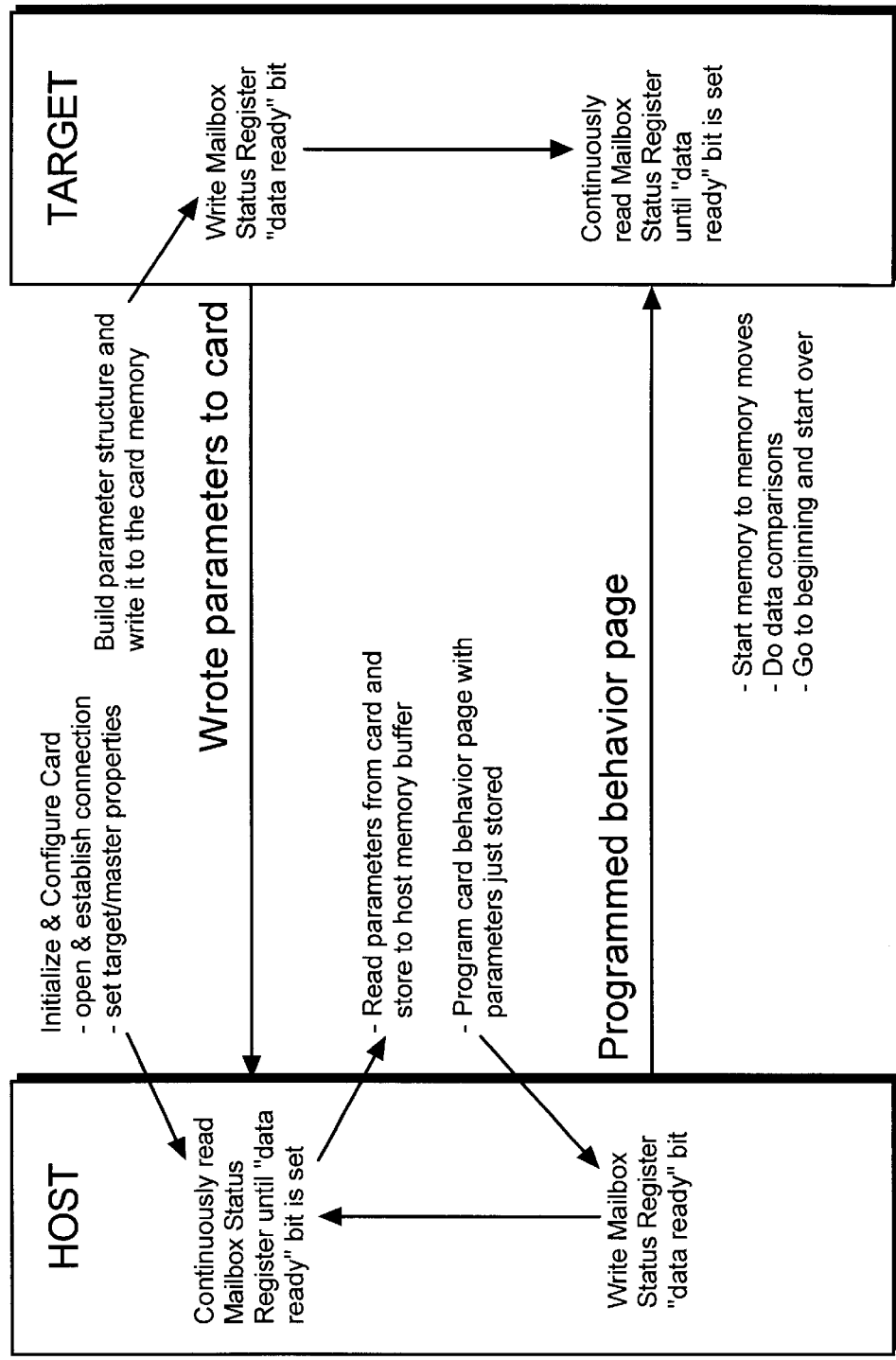
FIG. 5 is a flow diagram illustrating host/target communication employed with the PCI-X verification methods according to the present invention.

One significant difference between testing completer functionality (FIG. 3) and requester functionality is that to test requester functionality, the completer must have knowledge of the initiator's actions and when those actions will occur. The method in accordance with this teaching employs the "Mailbox" register. The "Mailbox" register is a 32-bit register, located in the PCI-X Configuration space of the exerciser/analyzer apparatus, which is utilized by the process according to the present invention to communicate with the host system. The host system is responsible for programming the exerciser/analyzer with the appropriate completer behavior page and, thus, it needs to know when it can program the selected functional behavior into the completer behavior page. Similarly, the target system needs to know when it can have the PCI-X requester initiate the transaction and when it must send the selected functional behavior to be programmed. The host/target communication is illustrated in greater detail in FIG. 5.

Referring again to FIG. 4, the steps are generally numbered in the order of execution. Referring now to the host side (FIG. 4A) of process 400, the completer device is initialized in step 404. This involves establishing a connection with the target system and initializing the exerciser/analyzer to act as a PCI-X completer. This process includes setting up card memory buffers, behavior page properties, address decoder values, and other power-on routines for initialization.

After initializing the completer (404), the Mailbox status register is read in step 408. In step 424, it is determined if the behavior page properties have been sent. If not, the process returns to step 408 which is repeated until the desired completer functional behavior has been sent. At this point the completer code should be executed.

After determining that the behavior page properties have been sent in step 424, the completer behavior page is programmed in step 428 with information selected and sent from the target system (416). This information includes the overall size of the transfer, whether initial wait states are to be inserted, 32-bit or 64-bit operation, issue a single data phase disconnect or not, issue a target abort or retry condition, disconnect on a specified allowable disconnect boundary (ADB), issue a split response, and other behavioral characteristics specific to a PCI-X completer-target. Also, the desired source/destination address alignment is set for the transaction that is intended to be initiated. This allows for full testing on various memory address alignments and cache boundaries.

Similar to the requester behavior page, the completer behavior page properties can also be divided into two main sections, address phase behaviors and data phase behaviors. The requester behavior is then controlled by how these various page properties are programmed. Exemplary address phase behaviors include 32-bit or 64-bit response and requester decode speed. Exemplary data phase behaviors include the insertion of initial wait states, various means of PCI-X termination (e.g., single data phase disconnect, retry, abort, split response), and also disconnecting the transaction on a specified allowable disconnect boundary (ADB).

After programming the completer behavior page, the Mailbox status register is written in step 432 with the appropriate bit to signal to the target system that the behavior page has been programmed and the transaction can start. The process then loops to step 408 to wait for the next behavior set to be sent.

Figure 4B:
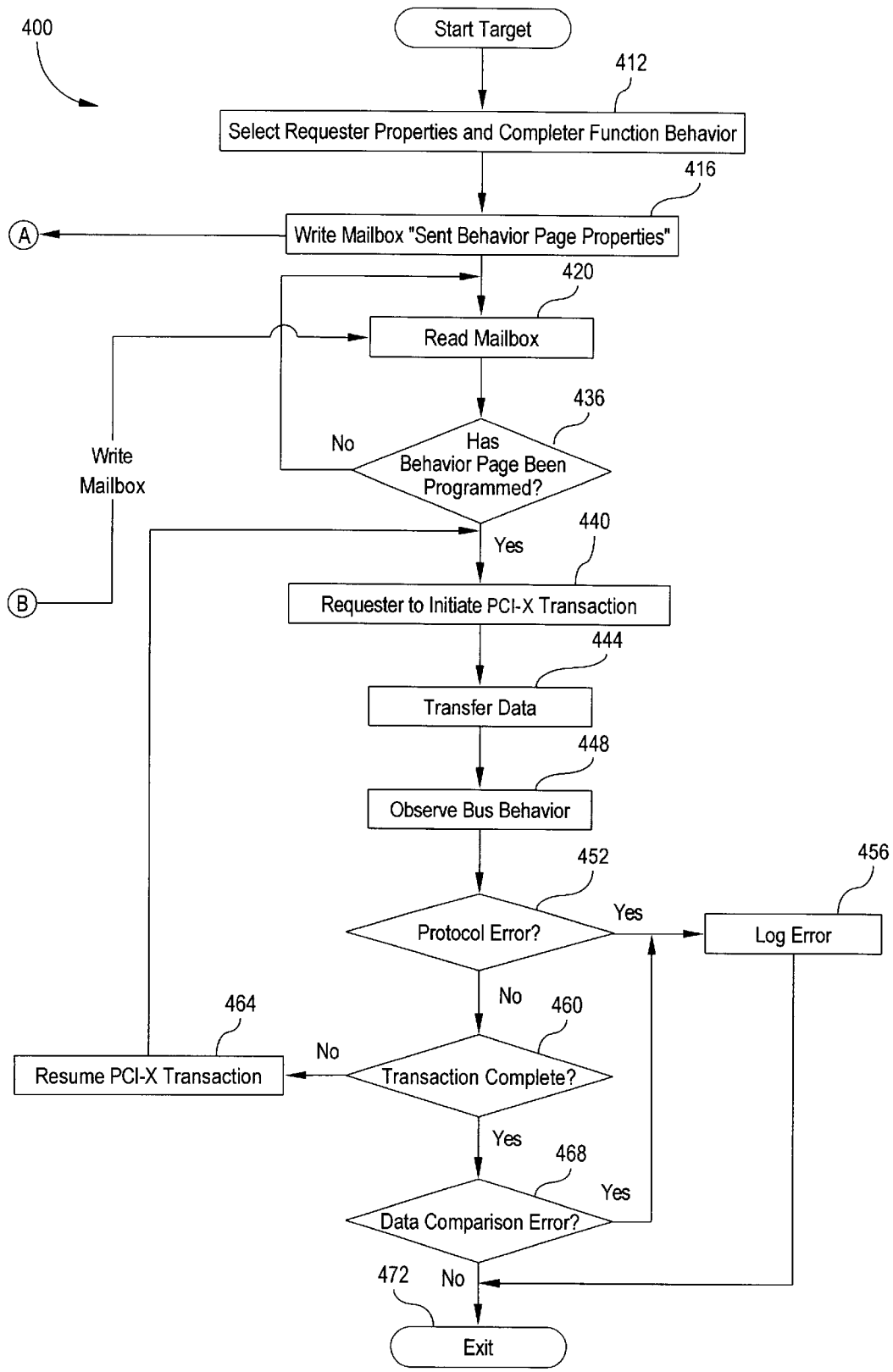

Referring now to the completer side of process 400 (FIG. 4B), the requester properties and completer functional behavior are set in step 412. This involves setting the appropriate requester configuration space bits (e.g., max. memory read byte count, max. outstanding split transactions, latency timer, and so forth) for the transaction. This also involves setup of the requester to execute a memory write/memory read sequence to/from the completer device. Next, the desired source/destination address alignment for the transaction that will be initiated is set. This allows for full testing on various memory address alignments and cache boundaries. Finally, this step also includes selecting the functional behavior set. In general, this includes selecting the desired completer behavior page properties for the transaction as described above (see step 428).

The process then proceeds to step 416 wherein the Mailbox status register is written with the appropriate bit to signal to the host system that the functional behavior properties have been selected and sent.

The process then proceeds to step 420, wherein the Mailbox status register is read, and step 436 wherein it is determined if the host has programmed the completer behavior page. Steps 420 and 436 are repeated until it is determined that the behavior page has been programmed and whether the host is ready to start the transaction.

Once it is determined in step 436 that the behavior page has been programmed, the process proceeds to step 440 in which the requester device initiates the transaction by selecting the completer device and placing the appropriate write command (memory write or memory write block) on the bus. The selected source/destination address alignment for the transaction will also be used at this point. At this point, the completer behavior page properties specific to address phase (ACK64) are applied when the completer claims the transaction.

After initiating the transaction in step 440, data is transferred in step 444 and the completer behavior page properties specific to the data phase (e.g., initial requester wait states, disconnect on specified ADB retries, aborts, splits, 64-bit to 32-bit downshifting, and so forth) are applied during the data transfer. In step 448, bus behavior is observed for the currently executing transfer. Specifically, the bus is monitored to assure that no PCI-X protocol specifications are violated. In one embodiment, the bus is monitored for PCI-X protocol violations in accordance with the PCI-X Addendum 1.0 to the PCI Local Bus Specification, Revision 2.2, published by PCI Special Interest Group. If protocol violations are observed (452) the error is signaled and logged in step 456 and the transaction ends (472). If no protocol violations occur in step 452, the process proceeds to step 460.

In step 460, it is determined whether the transaction is complete. If the transaction is not complete, the process continues to step 464 and the PCI-X transaction is resumed. Since completer behavior is ultimately controlled by the behavior page (programmed in step 428), in the case when the transaction is resumed, the process points back to step 440 and the requester initiates the programmed sequence. The programmed completer behavior is maintained in the behavior page and is started up at the appropriate point following the resumed transaction. Also, because the completer behavior is controlled, it is known when a single data phase disconnect or retry is going to be issued and thus, it is known where to start in the behavior page.

Once the transfer is complete (460), data corruption is checked in step 468. A write/read combination is required to perform a data comparison check at the end of transaction. Data corruption is not checked in step 448 because it is not yet known if the transaction is complete or not and, furthermore, data corruption can occur at times without violating PCI-X protocol. If a data miscompare is detected in step 468, the error is logged in step 456 and the process ends at step 472. If desired, the process 400 may then be repeated for any additional PCI-X commands and/or requester functional behaviors to be tested. In one embodiment, one or more commands are tested in combination with one or more functional behavior parameters throughout a desired range of variable functional behavior parameter values. In this manner, one or more variable completer functional behavior parameters may be incremented throughout a predetermined range of values to provide complete iterative testing of all desired commands and requester functional behavior parameter combinations.

EXAMPLE

Pseudo-code illustrating the testing methodology according to the present invention wherein all possible protocol combinations (e.g., for the latency timer, source and destination address alignment, disconnect on $N^{th}$ ADB) are tested is given in Table 1.

TABLE 1

```
for (latency_value = 0x01; latency_value < latency_timer_max; latency_value++)
// the latency timer is changed by the target code
    for (source_addr = 0x00; dest_addr < source_addr_offset_max; source_addr++)
    // test all source address alignments
        for (dest_addr = 0x00; dest_addr < dest_addr_offset_max; dest_addr++)
        // test all destination address alignments
            for (disconnect = 1; disconnect < disconnect_max; disconnect++)
            // walk through allowable disconnect boundaries (ADBs)
```

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 104 of one or more computer systems configured generally as described in FIG. 1. Until required by the computer system, the set of instructions may be stored in another computer readable memory such as the auxiliary memory of FIG. 1, for example in a hard disk drive or in a removable memory such as an optical disc for utilization in a DVD-ROM or CD-ROM drive, a magnetic media for utilization in a magnetic media drive, a magneto-optical disk for utilization in a magneto-optical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet that is interpreted after transmission to the computer system rather than prior to transmission. One skilled in the art would appreciate that the physical storage of the sets of instructions or applets physically changes the medium upon which it is stored electrically, magnetically, chemically, physically, or optically so that the medium carries computer readable information.

The description above should not be construed as limiting the scope of the invention, but as merely providing illustrations to some of the presently preferred embodiments of this invention. In light of the above description and examples, various other modifications and variations will now become apparent to those skilled in the art without departing from the spirit and scope of the present invention as defined by the appended claims. Accordingly, the scope of the invention should be determined solely by the appended claims and their legal equivalents.

What is claimed is:

1. A method for the automatic testing of a PCI-X bus system in an information handling system, comprising the steps of:
    (a) selecting a PCI-X command to be tested, the PCI-X command comprising a split completion command;
    (b) programming a PCI-X requester to exhibit predetermined functional behavior during a PCI-X transaction;
    (c) asserting said PCI-X command to initiate a PCI-X transaction, said transaction comprising transfer of data over said PCI-X bus;
    (d) transferring at least a portion of said data;
    (e) monitoring and recording the behavior of said PCI-X bus system;
    (f) determining whether a PCI-X protocol error has occurred;
    (g) if an error has occurred in step (f), logging said error and halting execution;
    (h) repeating steps (c) through (g) until it is determined that an error has occurred in step (f) or until said PCI-X transaction is complete; and
    (i) if said PCI-X transaction is complete:
        (j) writing data from a first memory location to a second memory location;
        (k) reading data from said second memory location; and
        (l) comparing data from said first memory location to data from said second memory location.

2. A method according to claim 1 wherein said PCI-X command comprises a memory read block command.

3. A method according to claim 1, wherein said PCI-X command comprises an I/O read command.

4. A method according to claim 1, wherein said PCI-X command comprises an I/O write command.

5. A method according to claim 1, wherein said PCI-X command comprises a configuration read command.

6. A method according to claim 1, wherein said PCI-X command comprises a configuration write command.

7. A method according to claim 1, wherein said predetermined functional behavior is in violation of PCI-X protocol.

8. A method according to claim 1, wherein said predetermined functional behavior is not in violation of PCI-X protocol.

9. A method for the automatic testing of a PCI-X bus system in an information handling system, comprising the steps of:
    (a) initializing a PCI-X completer device, said completer device programmable to exhibit predetermined functional behavior during a PCI-X transaction, the PCI-X transaction comprising a split completion command;
    (b) programming said PCI-X completer device to exhibit said predetermined functional behavior during said PCI-X transaction;
    (c) providing a PCI-X requester device, said PCI-X requester device comprising configuration address space, said configuration address space programmable to configure said PCI-X requester device;
    (d) programming said configuration address space to provide a first set of PCI-X bus utilization properties for said PCI-X requester device;
    (e) after said PCI-X completer device is programmed to exhibit said predetermined functional behavior, initiating said PCI-X transaction, said transaction comprising transfer of data over said PCI-X bus;
    (f) transferring at least a portion of said data;
    (g) monitoring and recording the behavior of said PCI-X bus system;
    (h) determining whether a PCI-X protocol error has occurred;
    (i) if an error has occurred in step (h), logging said error and halting execution;
    (j) repeating steps (e) through (i) until it is determined that an error has occurred in step (h) or until said PCI-X transaction is complete; and
    (k) if said PCI-X transaction is complete:
        (l) writing data from a first memory location to a second memory location;
        (m) reading data from said second memory location; and
        (n) comparing data from said first memory location to data from said second memory location.

10. A method according to claim 9, wherein said PCI-X command comprises a memory read block command.

11. A method according to claim 9, wherein said PCI-X command comprises an I/O read command.

12. A method according to claim 9, wherein said PCI-X command comprises an I/O write command.

13. A method according to claim 9, wherein said PCI-X command comprises a configuration read command.

14. A method according to claim 9, wherein said PCI-X command comprises a configuration write command.

15. A method according to claim 9, wherein said predetermined functional behavior is in violation of PCI-X protocol.

16. A method according to claim 9, wherein said predetermined functional behavior is not in violation of PCI-X protocol.

17. In an information handling system, an apparatus for the automatic testing and verification of a PCI-X bus system, comprising:
    (a) means for selecting a PCI-X command to be tested, the PCI-X command comprising a split completion command;
    (b) means for programming a PCI-X requester to exhibit predetermined functional behavior during a PCI-X transaction;
    (c) means for asserting said PCI-X command to initiate a PCI-X transaction, said transaction comprising transfer of data over said PCI-X bus;
    (d) means for transferring at least a portion of said data;
    (e) means for monitoring and recording the behavior of said PCI-X bus system;
    (f) means for determining whether a PCI-X protocol error has occurred;
    (g) means for logging an error and halting execution if an error has occurred in step (f);
    (h) means for repeating steps (c) through (g) until it is determined that an error has occurred in step (f) or until said PCI-X transaction is complete; and
    (i) if said PCI-X transaction is complete:
        (j) means for writing data from a first memory location to a second memory location;

(k) means for reading data from said second memory location; and (l) means for comparing data from said first memory location to data from said second memory location.

18. An apparatus according to claim 17, wherein said PCI-X command comprises a memory read block command.

19. An apparatus according to claim 17, wherein said PCI-X command comprises an I/O read command.

20. An apparatus according to claim 17, wherein said PCI-X command comprises an I/O write command.

21. An apparatus according to claim 17, wherein said PCI-X command comprises a configuration read command.

22. An apparatus according to claim 17, wherein said PCI-X command comprises a configuration write command.

23. An apparatus according to claim 17, wherein said predetermined functional behavior is in violation of PCI-X protocol.

24. A method according to claim 17, wherein said predetermined functional behavior is not in violation of PCI-X protocol.

25. In an information handling system, an apparatus for the automatic testing and verification of a PCI-X bus system, comprising:
 (a) means for initializing a PCI-X completer device, said completer device programmable to exhibit predetermined functional behavior during a PCI-X transaction, the PCI-X transaction comprising a split completion command;
 (b) means for programming said PCI-X completer device to exhibit said predetermined functional behavior during said PCI-X transaction;
 (c) means for providing a PCI-X requester device, said PCI-X requester device comprising configuration address space, said configuration address space programmable to configure said PCI-X requester device;
 (d) means for programming said configuration address space to provide a first set of PCI-X bus utilization properties for said PCI-X requester device;
 (e) means for initiating said PCI-X transaction after said PCI-X completer device is programmed to exhibit said predetermined functional behavior, said transaction comprising transfer of data over said PCI-X bus;
 (f) means for transferring at least a portion of said data;
 (g) means for monitoring and recording the behavior of said PCI-X bus system;
 (h) means for determining whether a PCI-X protocol error has occurred;
 (i) means for logging an error and halting execution if an error occurs in step (h);
 (j) means for repeating steps (e) through (i) until it is determined that an error has occurred in step (h) or until said PCI-X transaction is complete; and
 (k) if said PCI-X transaction is complete:
  (l) means for writing data from a first memory location to a second memory location;
  (m) means for reading data from said second memory location; and
  (n) means for comparing data from said first memory location to data from said second memory location.

26. An apparatus according to claim 25, wherein said PCI-X command comprises a memory read block command.

27. An apparatus according to claim 25, wherein said PCI-X command comprises an I/O read command.

28. An apparatus according to claim 25, wherein said PCI-X command comprises an I/O write command.

29. An apparatus according to claim 25, wherein said PCI-X command comprises a configuration read command.

30. An apparatus according to claim 25, wherein said PCI-X command comprises a configuration write command.

31. An apparatus according to claim 25, wherein said predetermined functional behavior is in violation of PCI-X protocol.

32. An apparatus according to claim 25, wherein said predetermined functional behavior is not in violation of PCI-X protocol.

33. In an information handling system, an apparatus for the automatic testing and verification of a PCI-X bus system, comprising:
 (a) control logic for selecting a PCI-X command to be tested;
 (b) control logic for programming a PCI-X requester to exhibit predetermined functional behavior during a PCI-X transaction;
 (c) control logic for asserting said PCI-X command to initiate a PCI-X transaction, said transaction comprising transfer of data over said PCI-X bus;
 (d) control logic for transferring at least a portion of said data;
 (e) control logic for monitoring and recording the behavior of said PCI-X bus system;
 (f) control logic for determining whether a PCI-X protocol error has occurred;
 (g) control logic for logging said error and halting execution if an error has occurred in step (f);
 (h) control logic for repeating steps (c) through (g) until it is determined that an error has occurred in step (f) or until said PCI-X transaction is complete; and
 (i) if said PCI-X transaction is complete:
  (j) control logic for writing data from a first memory location to a second memory location;
  (k) control logic for reading data from said second memory location; and
  (l) control logic for comparing data from said first memory location to data from said second memory location.

34. In an information handling system, an apparatus for the automatic testing and verification of a PCI-X bus system, comprising:
 (a) control logic for initializing a PCI-X completer device, said completer device programmable to exhibit predetermined functional behavior during a PCI-X transaction;
 (b) control logic for programming said PCI-X completer device to exhibit said predetermined functional behavior during said PCI-X transaction;
 (c) control logic for providing a PCI-X requester device, said PCI-X requester device comprising configuration address space, said configuration address space programmable to configure said PCI-X requester device;
 (d) control logic for programming said configuration address space to provide a first set of PCI-X bus utilization properties for said PCI-X requester device;
 (e) control logic for initiating said PCI-X transaction after said PCI-X completer device is programmed to exhibit said predetermined functional behavior, said transaction comprising transfer of data over said PCI-X bus;
 (f) control logic for transferring at least a portion of said data;
 (g) control logic for monitoring and recording the behavior of said PCI-X bus system;

(h) control logic for determining whether a PCI-X protocol error has occurred;

(i) control logic for logging an error and halting execution if an error occurs in step (h);

(j) control logic for repeating steps (e) through (i) until it is determined that an error has occurred in step (h) or until said PCI-X transaction is complete; and (k) if said PCI-X transaction is complete:
(l) control logic for writing data from a first memory location to a second memory location;
(m) control logic for reading data from said second memory location; and
(n) control logic for comparing data from said first memory location to data from said second memory location.

35. A program storage device readable by a machine, tangibly embodying a program of instructions executable by the machine to perform method steps for testing and verification of a PCI-X bus system in an information handling system, said method steps comprising:

(a) selecting a PCI-X command to be tested;

(b) programming a PCI-X requester to exhibit predetermined functional behavior during a PCI-X transaction;

(c) asserting said PCI-X command to initiate a PCI-X transaction, said transaction comprising transfer of data over said PCI-X bus;

(d) transferring at least a portion of said data;

(e) monitoring and recording the behavior of said PCI-X bus system;

(f) determining whether a PCI-X protocol error has occurred;

(g) if an error has occurred in step (f), logging said error and halting execution;

(h) repeating steps (c) through (g) until it is determined that an error has occurred in step (f) or until said PCI-X transaction is complete; and (i) if said PCI-X transaction is complete:
(j) writing data from a first memory location to a second memory location;
(k) reading data from said second memory location; and
(l) comparing data from said first memory location to data from said second memory location.

36. A program storage device readable by a machine, tangibly embodying a program of instructions executable by the machine to perform method steps for testing and verification of a PCI-X bus system in an information handling system, said method steps comprising:

(a) initializing a PCI-X completer device, said completer device programmable to exhibit predetermined functional behavior during a PCI-X transaction;

(b) programming said PCI-X completer device to exhibit said predetermined functional behavior during said PCI-X transaction;

(c) providing a PCI-X requester device, said PCI-X requester device comprising configuration address space, said configuration address space programmable to configure said PCI-X requester device;

(d) programming said configuration address space to provide a first set of PCI-X bus utilization properties for said PCI-X requester device;

(e) after said PCI-X completer device is programmed to exhibit said predetermined functional behavior, initiating said PCI-X transaction, said transaction comprising transfer of data over said PCI-X bus;

(f) transferring at least a portion of said data;

(g) monitoring and recording the behavior of said PCI-X bus system;

(h) determining whether a PCI-X protocol error has occurred;

(i) if an error has occurred in step (h), logging said error and halting execution;

(j) repeating steps (e) through (i) until it is determined that an error has occurred in step (h) or until said PCI-X transaction is complete; and (k) if said PCI-X transaction is complete:
(l) writing data from a first memory location to a second memory location;
(m) reading data from said second memory location; and
(n) comparing data from said first memory location to data from said second memory location.

* * * * *